United States Patent
Li

(10) Patent No.: US 7,463,999 B2
(45) Date of Patent: Dec. 9, 2008

(54) METHOD AND DEVICE FOR MONITORING COMPUTER CASE AND POWER SUPPLY UNIT

(76) Inventor: Qian Li, Room 803, No. 10 Taibai Building, Dongxiao St., Luohu District, Shenzhen (CN) 518027

( * ) Notice: Subject to any disclaimer, the term of this patent is extended or adjusted under 35 U.S.C. 154(b) by 0 days.

(21) Appl. No.: 11/568,527

(22) PCT Filed: Jul. 12, 2005

(86) PCT No.: PCT/CN2005/001028

§ 371 (c)(1),
(2), (4) Date: Oct. 31, 2006

(87) PCT Pub. No.: WO2006/005259

PCT Pub. Date: Jan. 19, 2006

(65) Prior Publication Data

US 2007/0233402 A1     Oct. 4, 2007

(30) Foreign Application Priority Data

Jul. 13, 2004   (CN) ................ 2004 1 0013452
Aug. 17, 2004  (CN) ................ 2004 1 0060731
Mar. 18, 2005  (CN) ................ 2005 1 0018401

(51) Int. Cl.
*G06F 3/02* (2006.01)
(52) U.S. Cl. ................ 702/182; 702/57; 702/58
(58) Field of Classification Search ............. 702/61, 702/118, 120, 130, 177, 182, 57, 58, 183; 326/38; 257/197; 713/100, 340
See application file for complete search history.

(56) References Cited

U.S. PATENT DOCUMENTS

| 5,878,377 | A | 3/1999 | Hamilton, II et al. |
| 5,920,264 | A | 7/1999 | Kim et al. |
| 6,601,168 | B1 * | 7/2003 | Stancil et al. ............... 713/100 |
| 6,968,470 | B2 * | 11/2005 | Larson et al. ............... 713/340 |
| 7,149,645 | B2 * | 12/2006 | Mangrulkar et al. ........ 702/130 |
| 7,256,610 | B1 * | 8/2007 | Balasubramanian et al. .. 326/38 |

* cited by examiner

*Primary Examiner*—Eliseo Ramos-Feliciano
*Assistant Examiner*—Felix Suarez
(74) *Attorney, Agent, or Firm*—Global IP Services; Tianhua Gu

(57) ABSTRACT

The present invention disclosed a method and device for monitoring computer case and power supply unit. Expanding monitor chip acts as slave device of SMBus to form the monitor device on the SMBus of computer integrated master device to measure the fan speed, temperature and working voltage of the computer case and power supply unit. Once the temperature signal received by temperature sensor and input to the monitor chip, it will processed by the monitor chip then outputs a control signal to control the fan speed via an amplifying driver circuit. The SMBus is connected with the connection head of the SMBus of PCI Express board, PCI board, PCI-X board and/or computer mainboard. With the method and device in the present invention, a smart computer case and power supply unit may be formed to reduce noise and power consumption. By monitoring working status via a program by the communication between SMBus and computer, it helps with better management of computer case and power supply unit device.

14 Claims, 5 Drawing Sheets

METHOD AND DEVICE FOR MONITORING COMPUTER CASE AND POWER SUPPLY UNIT

BACKGROUND OF THE INVENTION

1. Field of the Invention

The present invention relates to computer case and power supply unit, more specifically, the invention relate to monitor method and device for computer case and power supply unit.

2. Description of Prior Art

Case is an important component for a computer device; the most common cases are, for example, ATX and BTX. However, cases for server are always bigger, and generate more heat. Computer cases commonly cool down by fans. One of the components inside the cases is power supply unit, it supplies computer with 220V/110V AC. Since the power supply unit generates lots of heat while working, it is provided with a fan also. Fans for computer case and power supply unit may be directly connected to the connection head of the fan on the mainboard. Although the speed of fans may be adjusted, however, it is not a close loop, the speed of fan is not associated with the temperature, and the number of fans cannot be increased.

Currently, computer mainboards are provided with auto monitor circuit to monitor the operation status in real time, for example, voltage, CPU temperature, CPU fan speed etc, the monitor chip is provided with A/D converter and I/O interface, further, many components have system management bus (SMBus). While the computer is in operation, monitor circuit adjusts the fan speed according to CPU temperature, that is, if the temperature decreases, the fan speed decreases, and the fan speed increases while the temperature increased. Thus to reduce the noise generated by the fan, save the power, increase the life of the fan, and to insure the computer case and power supply unit working efficiently.

SMBus is the serial communication bus between chips that provided by Intel, it comprises a data line SMBDAT and clock line SMBCLK, each bus component is provided with an address, may figure a peripheral extension conveniently. One of the features of SMBus is, bus interfaces are integrated in components, and no addition bus interface needed, that is, plug and play. All the peripheral components with SMBus interfaces have the function of answering, it is commonly employed in computers, for example, south bridge chip series of Intel, such as ICH4, ICH5, ICH6 (I/O Controller HUB 6), or south bridge chip series VIA8233, AMD768 that compatible with Intel, may communicate with other devices by SMBus. SMBus is provided to many other electronic devices also. All of PCI Express criterion, PCI criterion (after PCI2.3), PCI-X criterion and CNR criterion of computer are support SMBus.

The I$^2$C bus developed by Philips has standard criterion and many peripheral devices are provided with I$^2$C interface, the features of I$^2$C is independence in structure and convenience in usage. Many I$^2$C bus components are compatible with SMBus, and most of them can directly use on SMBus.

In spite of the development as described above, the monitor for devices in computer cases nowadays is limited in the monitor circuits on the main board. There is no monitor of other devices in the computer case, for example, many fans for case and fans for power supply unit cannot adjust speed. The temperature of cases and devices in power supply unit is not associated with fan speed. As the fan is always working in full speed, noise is generated, and the working status cannot be monitored.

SUMMARY OF THE INVENTION

Method and device for monitoring computer case and power supply unit are provided in the present invention to solve the problem of monitoring the temperature, fan speed and voltage in computer cases and power supplies, further, to adjust the fan speed, reduce noise, save power according to the temperature, and to communicate with mainframe via SMBus, monitoring their working status by program.

Method for monitoring computer power supply unit, comprises the steps of:

(a) measuring the temperature in power supply unit by a temperature sensor of the monitor device that provided with SMBus, then inputting the temperature signal to a monitor chips for processing, and outputting a control signal to control fan speed by an amplifying drive circuit;

(b) measuring working voltage of the power supply unit by a voltage measuring circuit of the monitor device that provided with SMBus, then inputting the working voltage signal to monitor chip for processing;

(c) measuring fan speed of the power supply unit by a speed measuring circuit of the monitor device that provided with SMBus, then inputting the fan speed signal to monitor chip for processing;

(d) transmitting the parameters of temperature, working voltage and fan speed to computer by SMBus of the monitor device, and monitoring the working status of the power supply unit by a program.

Furthermore, in step (d), the program for monitoring the working status of the power supply unit comprises the steps of:

receiving the measured parameters of temperature, working voltage and fan speed;

displaying the measured parameters of temperature, working voltage and fan speed;

estimating whether the measured parameters of temperature, working voltage and fan speed have exceeded predefined parameters, if exceeded, launching an alarm information.

Furthermore, the SMBus is an I$^2$C bus that compatible therewith, and the monitor chip of the SMBus is an I$^2$C bus monitor chip that compatible therewith.

Another object of the invention is to provide a device for monitoring computer power supply unit that installed inside the power supply unit or on the circuit board of the power supply unit, said power supply unit provides power and signal to each component of the computer, wherein said device comprises:

a monitor chip having SMBus interface;

a temperature sensor that connecting with the input end of said monitor chip, and is adapted to acquire temperature parameters in power supply unit;

a voltage measuring circuit that connecting with the input end of said monitor chip, and is adapted to acquire working voltage parameters in power supply unit;

a rotate speed measuring circuit that connecting with the input end of said monitor chip, and is adapted to acquire rotate speed parameters of the fans in power supply unit;

a rotate speed control circuit, wherein an amplifying drive circuit is fixed between the monitor chip and fans, and is adapted to amplify the control signal output by the monitor chip and to control fan speed.

Furthermore, said monitor chip that provided with SMBus is connected with the SMBus of the computer as a slave-device to the bus, is adapted to transmit measured temperature, working voltage and fan speed parameters to computer and to monitor working status of the power supply unit by a program.

Furthermore, the interface of SMBus is connected with the connection head of the SMBus of the expanding board card or main board card in the computer, said expanding board card is PCI Express board, PCI board, PCI-X board or CNR board.

Furthermore, one fan speed control output of said monitor chip is connected with the amplifying drive circuit, two fans are parallel connected then connected with the amplifying drive circuit, the speed measuring ends of the two fans are connected with the rotate speed measuring ends of said monitor chip via a rotate speed matching circuit respectively.

Furthermore, said computer is a personal desktop, said computer power supply unit is a personal desktop power supply unit.

The present invention further provides a method for monitoring computer case, comprising the steps of:

(a) measuring air temperature in the case by a temperature sensor in a monitor device that provided with SMBus, then inputting the temperature signal to a monitor chip for processing, and outputting a control signal to control fan speed by an amplifying drive circuit;

(b) measuring the speed of the fan in the case by a speed measuring circuit in the monitor device that provided with SMBus, then inputting the fan speed signal to the monitor chip for processing;

(c) transmitting the parameters of temperature and fan speed to computer by SMBus of the monitor device, and monitoring the working status of devices in the case by a program.

Furthermore, in step (c), said program for monitoring status of the case of the computer further comprising the steps of:

receiving the measured temperature and fan speed parameter;

displaying the measured temperature and fan speed parameter;

judging whether the measured parameters of temperature and fan speed exceeded predefined parameters, if exceeded, launching an alarm information.

Furthermore, the SMBus is an I²C bus that is compatible therewith, and the monitor chip of the SMBus is an I²C bus monitor chip that is compatible therewith.

The present invention also provides a device for monitoring computer case, wherein said device is fixed on the expanding board card or expanding shelf of said computer case, said device comprising:

a monitor chip that provided with SMBus;

a temperature sensor that connecting with the input end of said monitor chip, and is adapted to acquire temperature parameters of air or devices in the computer case;

a voltage measuring circuit that connecting with the input end of said monitor chip, and is adapted to acquire working voltage parameters of the expanding board card;

a rotate speed measuring circuit that connecting with the input end of said monitor chip, and is adapted to acquire rotate speed parameters of the fans in the computer case;

a rotate speed control circuit, wherein an amplifying drive circuit is fixed between the monitor chip and fans, is adapted to amplify the control signal output by the monitor chip and to control fan speed; and a fan connection head on the expanding board card.

Furthermore, said monitor chip is connected with the SMBus of the computer, and adapted to transmit the measured parameters of temperature, working voltage and fan speed to the computer, and to monitor working status of the devices in the computer case by a program.

Furthermore, said monitor chip is provided with a SMBus interface, said interface is connected with the SMBus of the computer to act as a slave device of the SMBus, thus the monitor chip can communicate with the computer via the SMBus.

Furthermore, said expanding board card is PCI Express board, PCI board, PCI-X board or CNR board; said SMBus interface is connected with the connection head of the SMBus of the expanding board card, and the clock line and data line of the connection head of the SMBus are educed from an expanding slot of the expanding board card.

Furthermore, said expanding board card further having a temperature sensor connection head for extending the temperature sensor outwards.

Furthermore, one fan speed control output of said monitor chip is connected with the amplifying drive circuit, two fans are parallel connected then linked with the amplifying drive circuit, the speed measuring end of the two fans are connected with the rotate speed measuring end of said monitor chip via a rotate speed matching circuit respectively.

Furthermore, said computer is a personal desktop.

Comparing with the prior art, the present invention having the following advantages:

1. Because the computer case and power supply unit devices are monitored by monitor chip with SMBus interface, the method and device is easy and simple.
2. The computer case and power supply unit system becomes smart, it is low in noise, friendly to environment and savable for energy. Further, it communicates with computer via SMBus, the working status is monitored by program; it is helpful for managing computer cases and power supply unit devices.
3. It is with good compatibility and low in cost.

DETAILED DESCRIPTION OF THE INVENTION

Figure 1:
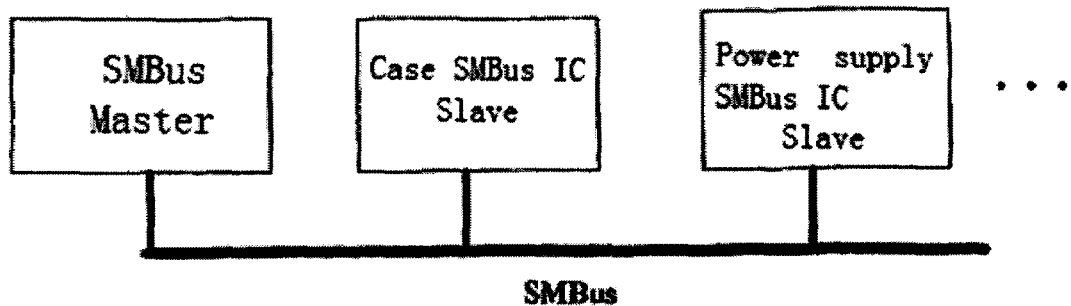
FIG. 1 is the connection schematic diagram of the SMBus, in accordance with the present invention.

As shown in FIG. 1, SMBus master is integrated on host computer, computer case and power supply unit monitor chip act as slave device. The SMBus may be I²C bus compatible thereof, and the SMBus monitor chip may be compatible with I²C bus.

The following embodiments are implemented with monitor chips with SMBus, the SMBus monitor chip is provided with a register. A presetting parameter and status may be written in the register by the programming tools provided by monitor chip manufacturer, according to the requirements of computer case and power supply unit device. Default values are employed if the user did not set any value, for example, temperature alarm value, A/D converter speed and I/O port selection etc (for details please refer to the manual). The parameters can be changed online.

Referring to Intel computer and its compatible product south bridge chip. South bridge chip is provided with an internal SMBus master controller, for example, ICH6 (82801F). The SMBus master controller in the internal ICH6 provides convenience in communication between processor and SMBus slave device. Only master controller can timely manage and check SMBus, such as, start, stop, send clock etc., and those SMBus interface component without CPU, can only be used as slave device in bus. All the read and write operations are be concluded as SMBus master operation, that is, write is main sending operation, read is main receiving operation. The foresaid SMBus operations are compatible with most of the I²C bus components.

Embodiment 1

Figure 3:
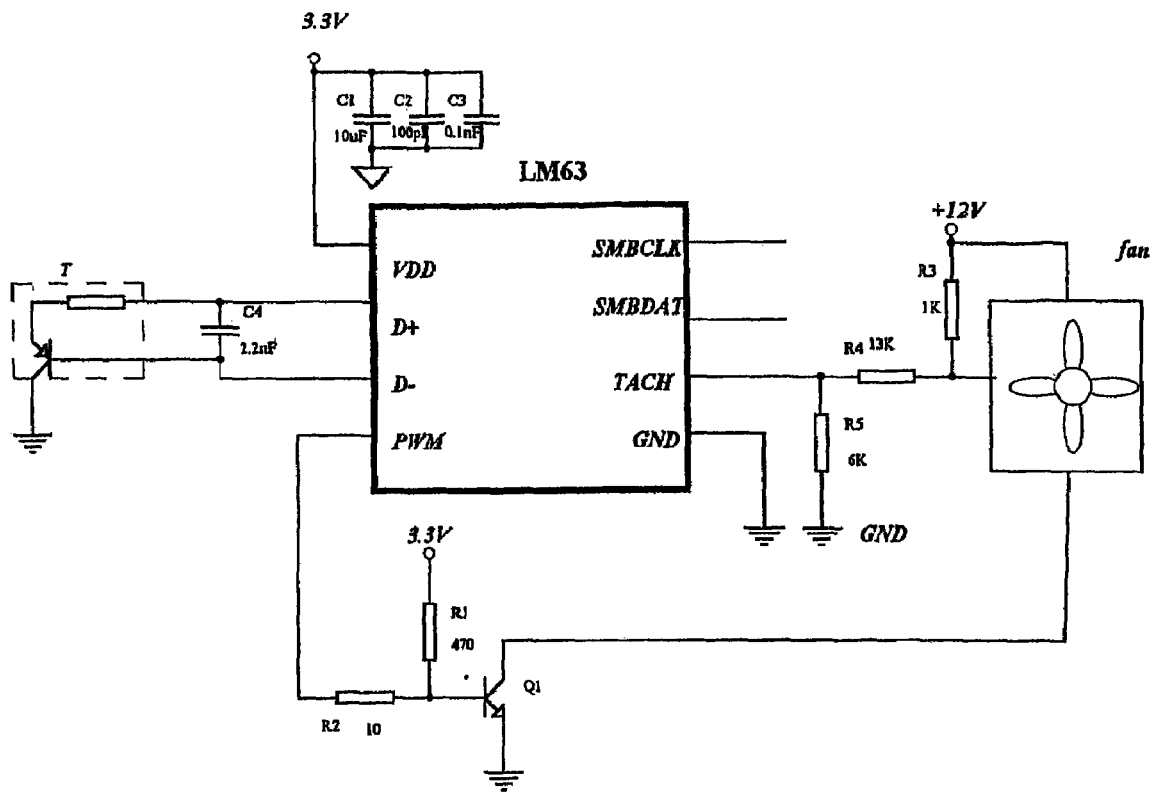
FIG. 3 is the circuit diagram of embodiment 1 and embodiment 4, in accordance with the present invention.
Figure 4:
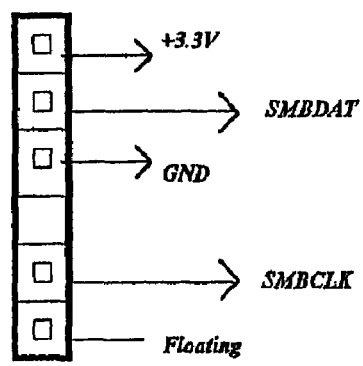
FIG. 4 is the structure schematic diagram of the connection head of the SMBus of the mainboard in embodiment 1, in accordance with the present invention.

As shown in FIG. 3, the computer in this embodiment employs ASUS double CPU server mainboard, model PR-DLS533, whereon an Intel south bridge chip CSB5 (Champion South Bridge 5) and an SMBus interface are fixed. As the interface pins shown in FIG. 4, wherefrom an SMBCLK line and SMBDAT line are connected to power supply unit, Floating is not in using. As the monitor device circuit shown in FIG. 3, LM63 chip is employed as monitor chip in the computer power supply unit circuit. Pin 7 and Pin 8 of LM63 is the SMBus interface, at this point, LM63 is a slave device of SMBus. The address of LM63 is 1001100. The primary functions of LM63 are as follows:

- Measuring temperature by 2N3904 transistor or PN node, D+ and D− ends input.
- Automatically correcting spontaneous heating, measuring temperature in one group of chip.
- Supporting built-in diode temperature measuring of P4 or P4-m processors
- Integrating PWM fan speed controlling function, output from PWM port.
- Programmable 8 speed shifting, reducing noise.
- Fan speed counting, input by TACH.
- Register compensation maladjustment temperature.
- Multi-function anti-ALERT/speed counting selection input.
- 10-digit counter, temperature resolution of 0.125 degrees Celsiur.
- SMBus 2.0 specification, supporting timeout.
- Compatible with LM86 series.
- Simplified 8-pin design.

The LM63 power supply is 3.3V, power is supplied by integrated power supply unit. 2N3904 is connected to D+ and D− of LM63, and 2N3904 is installed on the cooling plate of the computer power supply unit as a temperature sensor, A/D conversion is finished in LM63. PWM signal is output from pin 4 of LM63, and drive DC fan through the amplify circuit formed by R1, R2 and Q1. The fan in the circuit employs +12 power supply. Said fan is the fan B or A for power supply unit in FIG. 6. Speed measures of fan are input to rotate speed count pulse from pin 6 of LM63 via rotate speed measuring matching circuit formed by R3, R4, R5. Thus the automatic temperature adjusting system formed by said components will increase or decrease the speed of fan according to the temperature changes of heat generating components in the power supply unit. Related control functions are performed in LM63. Monitor circuit is combined with circuit of power supply unit, and employ one same circuit board.

Figure 8:
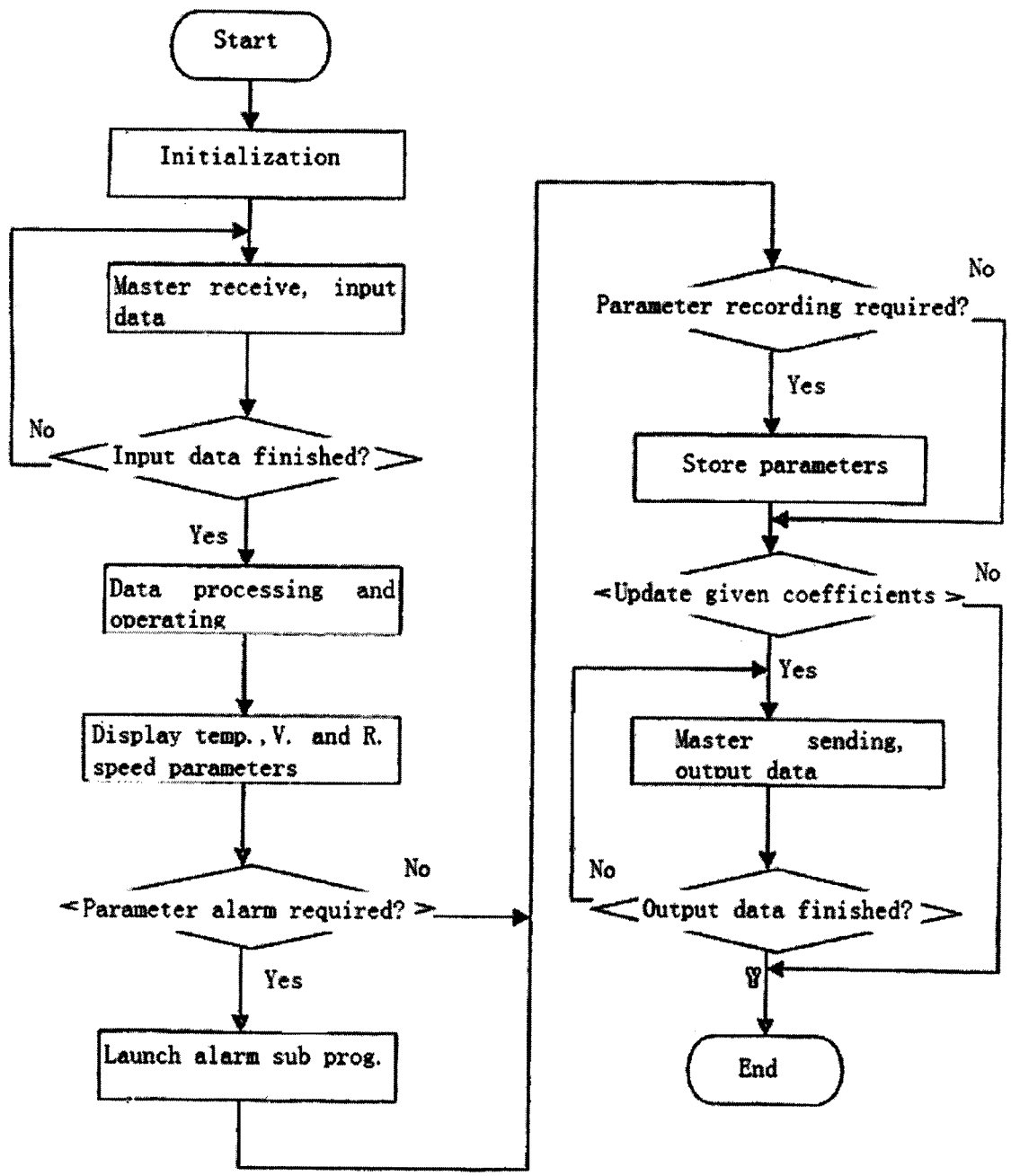
FIG. 8 is the main program flow chart of the program for monitoring computer case and power supply unit, in accordance with the present invention.

The operation status of said device is monitored by a program via receiving and sending data with SMBus in LM63. FIG. 8 is the main program flow chart of the program for monitoring computer case and power supply unit, in accordance with the present invention. As shown in FIG. 8, while in master receiving, the first byte (from the address) is sent from the master controller, slave device returns an answer bit, then slave device sends data to master controller. While in master sending, the first byte sent by master controller is from the address of slave device, then master controller sends data to slave device. In the present embodiment, data and instructions are sent via SMBus, and communicated with computer, thus to implement the functions on the computer as follows: temperature measuring and displaying function; voltage measuring and displaying function; fan speed measuring, displaying and controlling function; and all the parameters displayed are provided with name, absolute value and unit. Furthermore, when the measured parameters are greater or smaller than the predefined values, the program will launching alarm sub program, such as: generating sound, twinkle display and/or sending emails, and the parameters will be stored on memory medium by the program. The program may be operated under the graphical operating system of MICROSOFT at least, and the programs and parameters are recorded on the memory medium of the computer.

Figure 7:
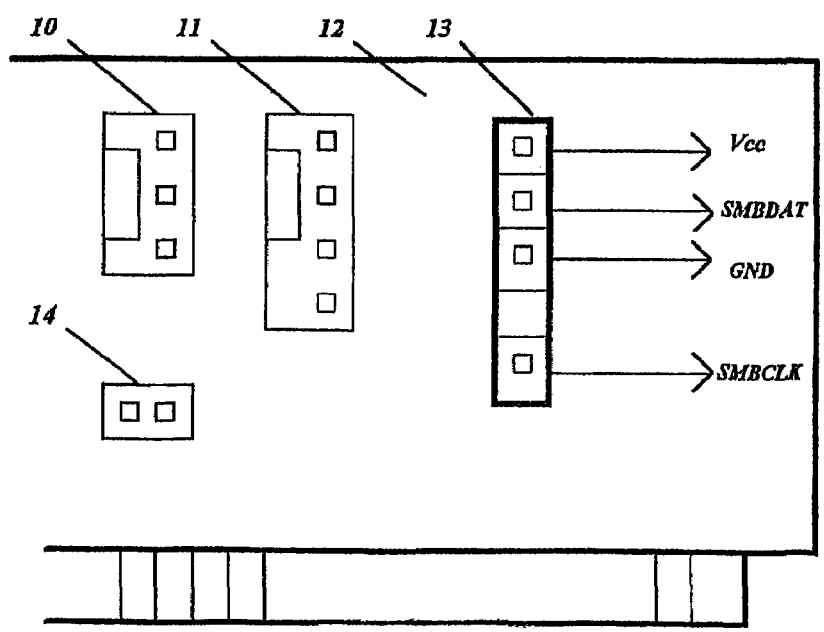
FIG. 7 is the structure view of the connection head of the SMBus for computer board card and the fan connection head, in accordance with the present invention, wherein the meaning of the numbers are: 10: 3-pin fan connection head, 11: 4-pin fan connection head, 12: computer expanding board card, 13: SMBus connection head, 14: temperature sensor connection head.

However, only few computer mainboards are provided with SMBus connection head, for wider application and providing users with more choices, a connection head extension device 13 of SMBus is employed (as shown in FIG. 7).

Embodiment 2

Figure 5:
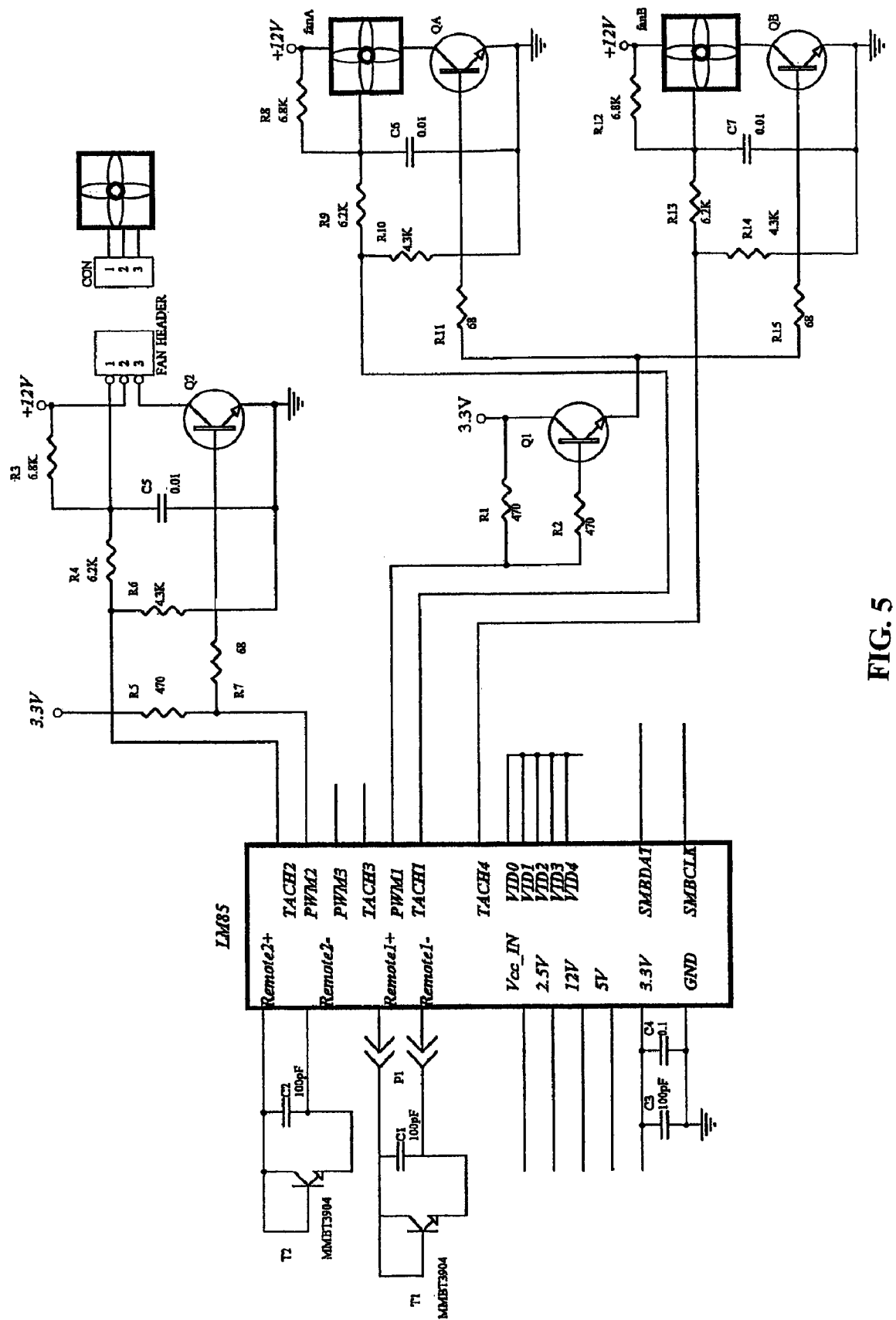
FIG. 5 is the circuit diagram implemented in embodiment 2, embodiment 3 and embodiment 5, in accordance with the present invention.

The circuit diagram of this embodiment is shown in FIG. 5. The computer employs ATX power supply unit and mainboard of 915/925 series. First of all, a SMBus connection head expanding device is fixed on PCI ExpressX1, on the expanding board card of the computer in FIG. 7. The SMBus connection head expanding device is shown in FIG. 7, number 13. There are 4 pins on the SMBus connection head expanding device, which are: SMBCLK, SMBDAT, power supply Vcc, ground GND and an empty pin for positioning. Clock line SMBCLK and data line SMBDAT of SMBus are educed from B5 and B6 of the board card slot of the computer. In this embodiment, Vcc=3.3V and educed from B8 of the slot of the board card, and GND is educed from B7 of the slot of the board card.

SMBDAT and SMBCLK is educed from PCI ExpressX1 of the computer and connected to computer power supply unit monitor circuit via the expanding device of SMBus connection head, and connecting the SMBus of the monitor chip with SMBDAT and SMBCLK of circuit LM85. Monitor circuit is combined with the circuit of power supply unit, while employs the same circuit and the integrated power supply unit thereon. LM85 is employed in the power supply unit monitor circuit, the default address of LM85 is 0101110, alternatively, 0101100 or 0101101, which may be selected by PWM3/AddEnable and TACH4/Addsel. Therefore, 3 LM85 may be provided on a single SMBus, the parameters be monitored are: voltage, temperature and fan speed. The monitor circuit is provided with built-in 8 bit ADC, which provides 3 sets of PWM output to control the fan speed. User may monitor parameters being measured at any time with program. In addition, launch an alarm signal when parameters exceed limit. And user also can configure upper and lower limit value by themselves.

Main functions of LM85 are described as follows:

SMBus 2.0 standard, SMBDAT, SBMCLK

Temperature measuring with digital filter

Group 1 for measuring in chip temperature, Group 2 for off chip temperature measuring: RE1+, RE1−, RE2+, RE2−

Built-in 8 bit A/D converter with resolution 1 degree Celsius 4 groups of fan speed control output: PWM1, PWM2, PWM3

4 groups of fan speed count input: TACH1, TACH2, TACH3, TACH4

Range of temperature measuring: 0-125 degrees Celsius

5 VID monitor port: VID0, VID1, VID2, VID3, VID4

24-pin design, QSOP packaging

XOR-tree testing mode

The LM85 in FIG. 5 is adapted to monitor the working status of power supply unit fan and other components, also, the chip also is adapted to measure the voltage of the power supply by the chip's voltage, such as +12V and +5V, to share the tasks of hardware monitor circuit on the computer. A resistor bleeder circuit may also be fixed on the input end of the voltage measuring to measure other non-nominal value voltage range. T1 in FIG. 5 is adapted to measure the temperature. LM85 is provided with 3 PWM control output, may drive 3 sets of fans respectively. For the power supply unit structures of the prepositive and postpositive fans, with the effect of the structure of a prepositive power supply unit fan and a postpositive fan, a high efficient air tunnel is formed inside the power supply unit. Therefore, 1 PWM1 outputs amplified Q1 to control fan A and fan B via QA and QB. Both fans rotating simultaneously may work better in phase. Only if the transistor in amplifying driver circuit allowable, the circuit can control multiple fans simultaneously, while the speed of each fan may be measured respectively. R8, R9, R10 consist a rotate speed signal measuring matching circuit, TACH1 is for count input, C6 is a filter capacitor, each fan speed driver and rotate speed measure is with similar circuit structure. Monitor chip LM85 controls said fan to adjust rotate speed automatically according to the temperature changes of T1.

Figure 6:
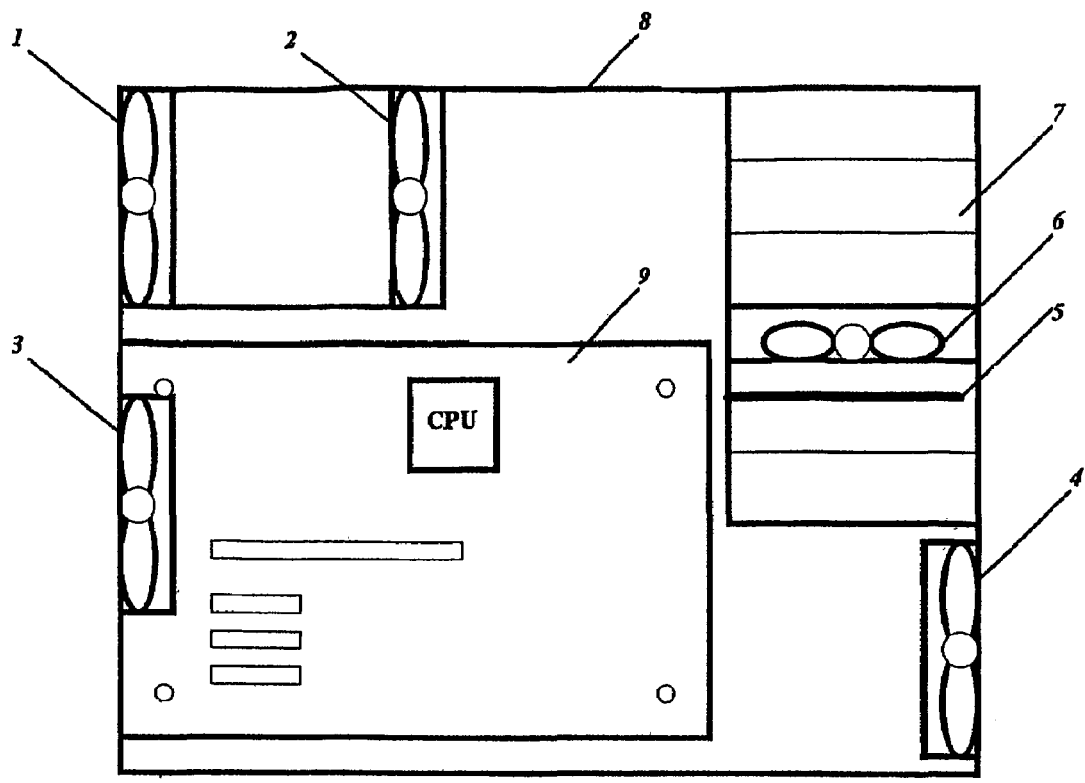
FIG. 6 is the fan location sketch view in the computer case, in accordance with the present invention, wherein the meaning of the numbers are: 1: power supply unit fan A 2: power supply unit fan B, 3: case fan A, 4: case fan B, 5: shelf monitor circuit board, 6: shelf fan, 7: expanding shelf, 8: computer case, 9: computer mainboard.

The output of PWM2 in this embodiment connects to the inside of the expanding shelf of the computer case. As shown in FIG. 6, 2 leads and the chip connection head of fan 3 in sensor T2 is connected from power supply unit monitor circuit to shelf, wherein number 6 in FIG. 6 corresponds to shelf fan. Sensor is stick on the measuring object, the object for measuring temperature is heat generating component, which is, hard disk in this embodiment. The fan is installed under or above the hard disk. It is obvious that a close loop control system is formed at this point. T2 is employed as temperature sensor, PWM2 outputs drive Q2, TACH2 measures fan speed, and all the functions are employing the monitor chip's control function to finish. The PWM3, TACH3 and VID# ends of the monitor chip shown in this embodiment are not employed.

Embodiment 3

Figure 2:
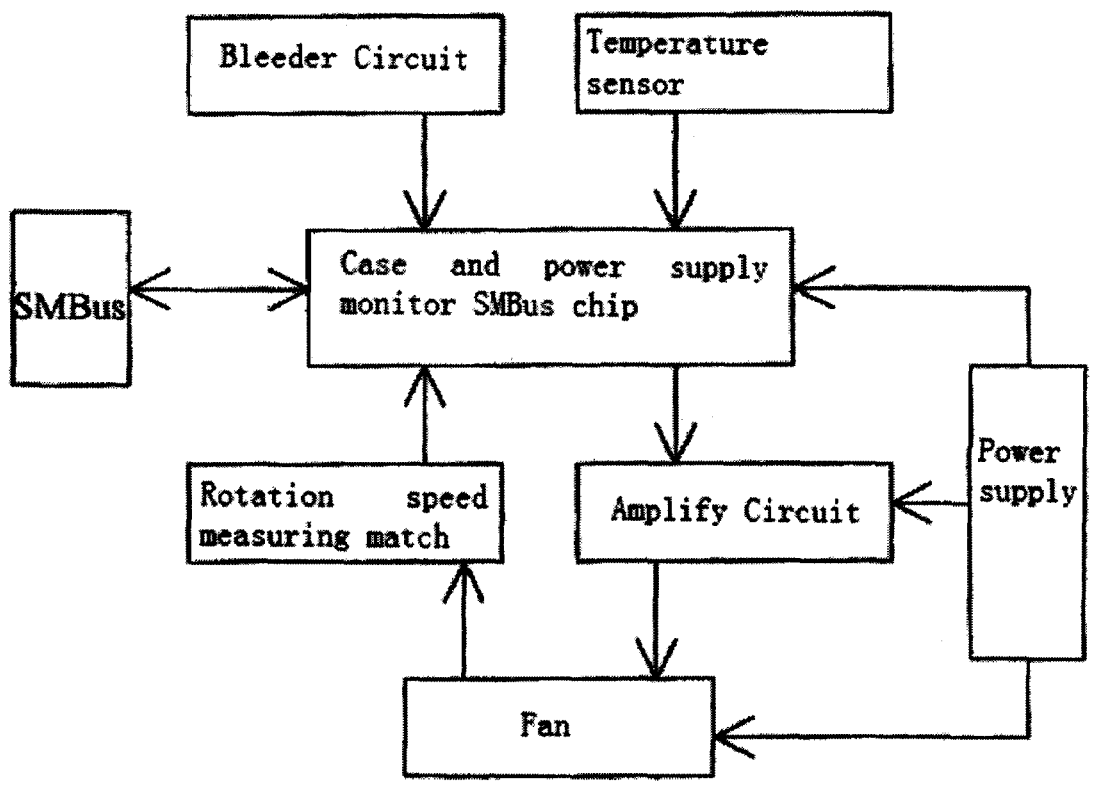
FIG. 2 is the block diagram of the monitor device of the computer case and power supply unit, in accordance with the present invention.

In this embodiment, monitor device formed by LM85 still be used. The circuit is basically the same as in FIG. 5 and FIG. 2. Monitor circuit is on PCI ExpressX16 board, and employing the power of 12V and 3.3V that provided by the board. At this point, the temperature monitoring object is the environmental air temperature inside the computer case, temperature sensor connection head is fixed on the board also, and temperature sensor T1 is connected via the connection head. The control object of PWM1 output becomes case fan A and case fan B in the computer case; control object of PWM2 output is the fan installed on PCI ExpressX16 video card, and T2 is adapted to measure the temperature of integrated circuit GPU on the video card, the fan is connected to the integrated circuit via radiator, while the control and communication function of the monitor chip keeps no change, which still communicates with the computer via SMBus to monitor their operation status by the program. Case fan outputs from the 3-pin fan connection head and/or 4-pin fan connection head (both compatible with mainboard fan connection head) in FIG. 7. In the present embodiment, 2 fan connection head output is employed, 3 pins are connected with the rotate speed count end, 12V and the output of transistor Q of the fan respectively; and 4-pin fan connection head is compatible with 3-pin fan. Tach3 is adapted to count if TACH4 is adapted to select addresses. The 2.5V, Vccp-IN, 5V, PWM3 and VID# ends shown in this embodiment are not employed. The fan in the circuit of figure of this embodiment should be provided with socket indication but not shown for clearness and universal implementation of FIG. 5. Meanwhile, the chip may be adapted to measure +12V and +3.3V voltage of PCI ExpressX16 circuit board.

Embodiment 4

The monitor circuit is installed on the expanding shelf of the computer case in this embodiment. As shown in FIG. 6, wherein number 6 corresponds to shelf fan, number 5 corresponds to shelf monitor circuit board, SMBus monitor chip and peripheral components are installed thereon, a 12V power supply is achieved by computer power supply unit external socket, and the heat generating component is the devices on the shelf, such as, hard disk, temperature sensor T is stick on it firmly. Referring to the circuit employed in embodiment 1 and FIG. 3, in this embodiment, SMBus connection head is installed on the PCI board and connected to the shelf monitor circuit board. The formation of SMBus connection head is shown in the SMBus 13 in FIG. 7. SMBus connection head is provided with 4-pins: SMBCLK, SMBDAT, power supply Vcc, ground GND and an empty pin for positioning. The clock line SMBCLK and data line SMBDAT of SMBus are educed from slots A40, A41 of the PCI board card, and in this embodiment, Vcc=3.3V.

Embodiment 5

This embodiment employs the circuit as FIG. 5 in combination with embodiment 2 and embodiment 3, which employs 2 LM85 to form 2 monitor devices to monitor case and power supply unit devices respectively. Note that 2 different addresses are employed for 2 LM85 chip.

The embodiments 1~5 described above transmit data and instructions via SMBus to communicate with computer, which is implemented on the computer by program: the functions of temperature measuring and displaying, the functions of voltage measuring and displaying, the functions of fan speed measuring, displaying and controlling, where the parameters displayed are provided with name, amount and unit.

What is claimed is:

1. A method for monitoring ATX computer power supply unit, comprising the steps of:
   (a) measuring temperature in the ATX power supply unit by a monitor device provided with SMBus interface, then inputting the temperature signal to a monitor chip for processing, and outputting a control signal by the monitor chip to control fan speed by an amplifying drive circuit;
   (b) measuring working voltage of the ATX power supply unit by a voltage measuring circuit of the monitor device provided with SMBus interface, then inputting the working voltage signal to the monitor chip for processing;
   (c) measuring a fan speed of the ATX power supply unit by a speed measuring circuit of the monitor device provided with SMBus interface, then inputting the fan speed signal to the monitor chip for processing;
   (d) transmitting the parameters of temperature, working voltage and fan speed through the SMBus interface of the monitor device to host computer which is connected with the SMBus interface, and monitoring the working status of the power supply unit by a program of the host computer, the monitoring is made by the host computer mainly and the monitor chip in assistant.

2. The method of claim 1, wherein in step (d), the program for monitoring the working status of the power supply unit further comprises the steps of:
   the host computer receiving the measured parameters of the temperature, working voltage and fan speed;
   displaying the measured parameters of the temperature, working voltage and fan speed;
   estimating whether the measured parameters of the temperature, working voltage and fan speed have exceeded predefined parameters, if exceeded, launching alarm information.

3. The method of claim 1, wherein the SMBus is an $I^2C$ bus that is compatible therewith, and the monitor chip of the SMBus is an $I^2C$ bus monitor chip that is compatible therewith.

4. A device for monitoring a ATX computer power supply unit installed inside the ATX power supply unit or on a circuit board of the ATX power supply unit comprising:
   a monitor chip provided with a SMBus interface;
   a temperature sensor connecting with an input end of the monitor chip for acquiring temperature parameters in the ATX power supply unit;
   a voltage measuring circuit connecting with the input end of the monitor chip for acquiring working voltage parameters of the ATX power supply unit;
   a rotate speed measuring circuit connecting with the input end of the monitor chip for acquiring rotate speed parameters of fans in the ATX power supply unit;
   a rotate speed control circuit having an amplifying drive circuit fixed between the monitor chip and fans for amplifying control signals output by the monitor chip to control the fan speed;
   the monitor chip provided with SMBus interface connected with the SMBus of the host computer as a slave-device to the SMBus to transmit the measured temperature, working voltage and fan speed parameters to the host computer for monitoring working status of the power supply unit by a program of the host computer, the monitoring is made by the host computer mainly and by the monitor chip in assistant.

5. The device of claim 4, wherein the interface of SMBus is connected with the connection head of the SMBus of an expanding board card or a main board card in the computer, the expanding board card is a PCI-Express board, PCI board, PCI-X board or CNR board.

6. The device of claim 4, wherein one fan speed control output of the monitor chip is connected with the amplifying drive circuit, two fans are parallel connected then linked with the amplifying drive circuit, the speed measuring ends of the two fans are connected with the rotate speed measuring end of said monitor chip via a rotate speed matching circuit respectively.

7. The device of claim 4, wherein said computer is a personal desktop, said computer power supply unit is a personal desktop power supply unit.

8. A method for monitoring computer case by PCI-Express board comprising the steps of:
   (a) measuring air temperature in the case by a temperature sensor in a monitor device with a SMBus interface located on the PCI-Express board, then inputting the temperature signal to a monitor chip for processing, and outputting a control signal from the monitor chip to control fan speed by an amplifying drive circuit;
   (b) measuring fan speed in the case by a speed measuring circuit in the monitor device provided with the SMBus interface located on the PCI-Express board, then inputting the fan speed signal to the monitor chip for processing;
   (c) transmitting the parameters of temperature and fan speed to host computer by the SMBus of the host computer, and monitoring the working status in the case by a program of the host computer, the monitoring is made by the host computer mainly and the monitor chip in assistant.

9. The method of claim 8, wherein in step (c), the program for monitoring status of the case of the computer further comprising the steps of:
   receiving the measured temperature and fan speed parameters;
   displaying the measured temperature and fan speed parameters;
   estimating whether the measured parameters of temperature and fan speed exceeded predefined parameters, if exceeded, launching alarm information.

10. The method of claim 8, wherein the SMBus is an $I^2C$ bus that is compatible therewith, and the monitor chip of the SMBus is an $I^2C$ bus monitor chip that is compatible therewith.

11. A device for monitoring computer case comprising:
   aboard of PCI-Express board or PCI board or PCI-X board and the following parts which are on the board:
   a monitor chip provided with a SMBus;
   a temperature sensor connecting with an input end of the monitor chip for acquiring temperature parameters of air or devices in the computer case;
   a voltage measuring circuit connecting with the input end of the monitor chip for acquiring working voltage parameters of the expanding board card;
   a rotate speed measuring circuit connecting with the input end of said monitor chip for acquiring rotate speed parameters of fans in the computer case;
   a rotate speed control circuit having an amplifying drive circuit is fixed between the monitor chip and fans to amplify control signals output by the monitor chip for controlling fan speed;

a fan connection head on the board card;

the monitor chip connected with the SMBus through SMBus interface as a slave device of the SMBus, the host computer is a main equipment.

12. The device of claim 11, wherein said monitor chip provided with a SMBus interface, connected with the SMBus of the computer acting as a slave device of the SMBus for communicating with the host computer via the SMBus.

13. The device of claim 11, wherein one fan speed control output of said monitor chip is connected with the amplifying drive circuit, two fans are parallel connected then linked with the amplifying drive circuit, speed measuring ends of the two fans are connected with the rotate speed measuring end of said monitor chip via a rotate speed matching circuit respectively.

14. The device of claim 11, wherein said computer is a personal desktop.

* * * * *